United States Patent
Yang et al.

(10) Patent No.: US 10,717,662 B2
(45) Date of Patent: Jul. 21, 2020

(54) PROCESS FOR THE REMOVAL OF IRON AND PHOSPHATE IONS FROM A CHLORINATED HYDROCARBON WASTE STREAM

(71) Applicant: Honeywell International Inc., Morris Plains, NJ (US)

(72) Inventors: Terris Yang, East Amherst, NY (US); Hsueh Sung Tung, Getzville, NY (US)

(73) Assignee: Honeywell International Inc., Morris Plains, NJ (US)

( * ) Notice: Subject to any disclaimer, the term of this patent is extended or adjusted under 35 U.S.C. 154(b) by 250 days.

(21) Appl. No.: 15/890,586

(22) Filed: Feb. 7, 2018

(65) Prior Publication Data

US 2019/0241449 A1     Aug. 8, 2019

(51) Int. Cl.

| | |
|---|---|
| C02F 1/00 | (2006.01) |
| C02F 1/66 | (2006.01) |
| C02F 1/72 | (2006.01) |
| C02F 101/10 | (2006.01) |
| C02F 101/20 | (2006.01) |
| C02F 101/34 | (2006.01) |
| C02F 101/36 | (2006.01) |
| C02F 1/52 | (2006.01) |
| C02F 1/38 | (2006.01) |
| C02F 101/12 | (2006.01) |
| C02F 103/36 | (2006.01) |

(52) U.S. Cl.
CPC .......... *C02F 1/5245* (2013.01); *C02F 1/5236* (2013.01); *C02F 1/66* (2013.01); *C02F 1/72* (2013.01); *C02F 1/001* (2013.01); *C02F 1/385* (2013.01); *C02F 2001/007* (2013.01); *C02F 2101/105* (2013.01); *C02F 2101/12* (2013.01); *C02F 2101/203* (2013.01); *C02F 2101/34* (2013.01); *C02F 2101/36* (2013.01); *C02F 2103/36* (2013.01)

(58) Field of Classification Search
None
See application file for complete search history.

(56) References Cited

U.S. PATENT DOCUMENTS

| | | | |
|---|---|---|---|
| 4,615,285 A * | 10/1986 | Bentell | F23G 5/085 |
| | | | 588/311 |
| 6,166,274 A | 12/2000 | Chen et al. | |
| 6,844,475 B1 | 1/2005 | Tung et al. | |
| 7,829,747 B2 | 11/2010 | Wang et al. | |
| 8,202,617 B2 | 6/2012 | Kitahara et al. | |
| 8,217,208 B2 | 7/2012 | Hulse et al. | |
| 8,618,338 B2 | 12/2013 | Elsheikh et al. | |
| 8,704,017 B2 | 4/2014 | Pokrovski et al. | |
| 8,779,218 B2 | 7/2014 | Pigamo et al. | |
| 8,835,700 B2 | 9/2014 | Pokrovski et al. | |
| 8,921,621 B2 | 12/2014 | Cottrell et al. | |
| 9,018,430 B2 | 4/2015 | Merkel et al. | |
| 9,024,092 B2 | 5/2015 | Merkel et al. | |
| 9,045,386 B2 | 6/2015 | Tung et al. | |
| 9,102,579 B2 | 8/2015 | Light et al. | |
| 9,102,580 B2 | 8/2015 | Nappa et al. | |
| 9,328,043 B2 | 5/2016 | Wang et al. | |
| 9,334,206 B2 | 5/2016 | Wang et al. | |
| 2003/0150818 A1* | 8/2003 | Carter | C02F 9/00 |
| | | | 210/722 |
| 2016/0332936 A1 | 11/2016 | Wang et al. | |

FOREIGN PATENT DOCUMENTS

| | | |
|---|---|---|
| JP | 2017124997 A | 7/2017 |
| WO | 2016009946 A1 | 1/2016 |

* cited by examiner

*Primary Examiner* — Bradley R Spies
(74) *Attorney, Agent, or Firm* — Faegre Drinker Biddle & Reath LLP

(57) ABSTRACT

A process for the simultaneous removal of iron and phosphate ions from a chlorinated hydrocarbon waste stream, such as a waste stream derived from a process for manufacturing 1,1,1,3,3-pentachloropropane (HCC-240fa) and/or 1,1,1,3-tetrachloropropane (HCC-250fb). The waste stream contains at least one of chlorinated hydrocarbons, tributyl phosphate (TBP) and/or triethyl phosphate (TEP), iron, $FeCl_2$ and/or $FeCl_3$, a $TBP-FeCl_2$ complex and/or a $TBP-FeCl_3$ complex, and a $TEP-FeCl_2$ complex and/or a $TEP-FeCl_3$ complex, and is subjected to thermal oxidation to generate a second, aqueous waste stream containing at least one of hydrogen chloride (HCl), $FeCl_3$ and/or $FeCl_2$, and $H_3PO_4$. The second waste stream is exposed to a base to generate a precipitate including at least one insoluble compound selected from the group consisting of $FePO_4$, $Fe(OH)_3$, and $Ca_3(PO_4)_2$, and the precipitate is separated from the second waste stream to produce a liquid phase including only trace amounts of iron and phosphate ions.

20 Claims, No Drawings

PROCESS FOR THE REMOVAL OF IRON AND PHOSPHATE IONS FROM A CHLORINATED HYDROCARBON WASTE STREAM

BACKGROUND

1. Field of the Disclosure

The present disclosure is related to a process for the removal and, in one embodiment, the simultaneous removal, of iron and phosphate ions from a chlorinated hydrocarbon waste stream.

2. Description of the Related Art

In some commercial processes for manufacturing chlorinated hydrocarbons such as 1,1,1,3,3-pentachloropropane (HCC-240fa) and/or 1,1,1,3-tetrachloropropane (HCC-250fb), catalysts such as iron powder and tributyl phosphate (TBP) and/or triethyl phosphate (TEP) are typically used. Exemplary processes for manufacturing HCC-240fa and HCC-250fb are described in detail in U.S. Pat. Nos. 8,722,946 and 8,907,147, the disclosure of which is incorporated herein by reference.

In one exemplary process for manufacturing HCC-240fa, carbon tetrachloride is reacted with vinyl chloride to form HCC-240fa according to the following reaction (1):

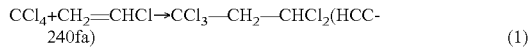

$$CCl_4 + CH_2\!=\!CHCl \rightarrow CCl_3\!-\!CH_2\!-\!CHCl_2 \text{(HCC-240fa)} \quad (1)$$

In one exemplary process for manufacturing HCC-250fb, carbon tetrachloride is reacted with ethylene to form HCC-250fb according to the following reaction (2):

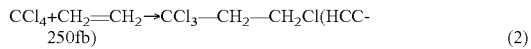

$$CCl_4 + CH_2\!=\!CH_2 \rightarrow CCl_3\!-\!CH_2\!-\!CH_2Cl \text{(HCC-250fb)} \quad (2)$$

In each of the foregoing reactions (1) and (2), iron powder and TBP or TEP may be used to generate the reaction catalyst in-situ, namely, a complex of $TBP\text{-}FeCl_2$ or $TEP\text{-}FeCl_2$.

In each of the foregoing processes, the catalyst needs to be purged periodically in order to remove high boiling organic impurities that are formed during the reactions and to maintain the catalyst activity. However, the catalyst removal generates a stream containing at least one of chlorinated hydrocarbons, TBP and/or TEP, iron, $FeCl_2$ and/or $FeCl_3$, a $TBP\text{-}FeCl_2$ complex and/or a $TBP\text{-}FeCl_3$ complex, and a $TEP\text{-}FeCl_2$ complex and/or a $TEP\text{-}FeCl_3$ complex.

The foregoing catalyst removal stream is considered a waste stream, and chlorinated hydrocarbons and phosphorus-containing organic compounds in the waste stream are typically destroyed by thermal oxidation or incineration.

Also, a waste water stream containing high concentrations of hydrogen chloride (HCl), $FeCl_3$ and/or $FeCl_2$, and $H_3PO_4$ is generated after incineration, and iron and/or phosphate ions ($Fe^{3+}$ and/or $PO_4^{3-}$) are typically required to be removed from the waste water stream before the stream is discharged in order to meet applicable environmental regulations.

SUMMARY

The present disclosure provides a process for the simultaneous removal of iron and phosphate ions from a chlorinated hydrocarbon waste stream, such as a waste stream derived from a process for manufacturing 1,1,1,3,3-pentachloropropane (HCC-240fa) and/or 1,1,1,3-tetrachloropropane (HCC-250fb). The waste stream contains at least one of chlorinated hydrocarbons, tributyl phosphate (TBP) and/or triethyl phosphate (TEP), iron, $FeCl_2$ and/or $FeCl_3$, a $TBP\text{-}FeCl_2$ complex and/or a $TBP\text{-}FeCl_3$ complex, and a $TEP\text{-}FeCl_2$ complex and/or a $TEP\text{-}FeCl_3$ complex, and is subjected to thermal oxidation to generate a second, aqueous waste stream containing at least one of hydrogen chloride (HCl), $FeCl_3$ and/or $FeCl_2$, $H_3PO_4$ and water. The second waste stream is exposed to a base to generate a precipitate including at least one insoluble compound selected from the group consisting of $FePO_4$, $Fe(OH)_3$, and $Ca_3(PO_4)_2$, and the precipitate is separated from the second waste stream to produce a liquid phase including only trace amounts of iron and phosphate ions.

In one form thereof, the present invention provides a process for the removal of iron and phosphate ions from a waste stream, including the steps of: providing a waste stream containing at least one of hydrogen chloride (HCl), $FeCl_3$, $FeCl_2$, $H_3PO_4$, and water; exposing the waste stream to a base to generate a precipitate including at least one insoluble compound selected from the group consisting of $FePO_4$, $Fe(OH)_3$, and $Ca_3(PO_4)_2$; and separating the precipitate from the waste stream.

Following the separation step, the waste stream may be a liquid phase including $CaCl_2$ and at least one of the following: less than 500 ppm of iron ions; and less than 500 ppm phosphate ions. Alternatively, following the separation step, the waste stream may be a liquid phase including $CaCl_2$ and at least one of the following: less than 10 ppm of iron ions; and less than 10 ppm phosphate ions.

The process may further include the additional steps, following the separating step, of: vaporizing liquid from the waste stream; and recovering solid $CaCl_2$.

The base may be selected from the group consisting of potassium hydroxide (KOH), sodium hydroxide (NaOH), calcium oxide (CaO), calcium hydroxide ($Ca(OH)_2$), and combinations thereof.

Following the exposing step, the pH of the waste stream may be from 1 to 8. Following the separation step, a molar ratio of iron ions to phosphate ions in the second waste stream may be from 1 to 10. Alternatively, following the separation step, a molar ratio of iron ions to phosphate ions in the waste stream may be from 1 to 2.

The separating step may include separating the precipitate from the waste stream by at least one method selected from the group consisting of filtration, sedimentation, flocculation, centrifugal separation, and combinations thereof.

In another form thereof, the present disclosure provides a process for the removal of iron and phosphate ions from a waste stream, including the steps of: providing an organic-containing first waste stream containing at least one of chlorinated hydrocarbons, tributyl phosphate (TBP) and/or triethyl phosphate (TEP), iron, $FeCl_2$ and/or $FeCl_3$, a $TBP\text{-}FeCl_2$ complex and/or a $TBP\text{-}FeCl_3$ complex, and a $TEP\text{-}FeCl_2$ complex and/or a $TEP\text{-}FeCl_3$ complex; subjecting the first waste stream to thermal oxidation to generate a second waste stream containing at least one of hydrogen chloride (HCl), $FeCl_3$, $FeCl_2$, $H_3PO_4$, and water; exposing the second waste stream to a base to generate a precipitate including at least one insoluble compound selected from the group consisting of $FePO_4$, $Fe(OH)_3$, and $Ca_3(PO_4)_2$; and separating the precipitate from the second waste stream.

Following the separation step, the second waste stream may be a liquid phase including $CaCl_2$ and at least one of the following: less than 500 ppm of iron ions; and less than 500 ppm phosphate ions. Alternatively, following the separation step, the second waste stream may be a liquid phase including $CaCl_2$ and at least one of the following: less than 10 ppm of iron ions; and less than 10 ppm phosphate ions.

The process may further include the additional steps, following the separating step, of: vaporizing liquid from the second waste stream; and recovering solid $CaCl_2$.

The base may be selected from the group consisting of potassium hydroxide (KOH), sodium hydroxide (NaOH), calcium oxide (CaO), calcium hydroxide ($Ca(OH)_2$), and combinations thereof.

Following the subjecting step, the second waste stream may include a total concentration of $FeCl_3$ and $FeCl_2$ of less than 20 wt. %, the second waste stream may include a total concentration of $H_3PO_4$ of less than 20 wt. %, and/or the second waste stream includes less than 40 wt. % of HCl.

Following the separation step, a molar ratio of iron ions to phosphate ions in the second waste stream may be from 1 to 10, or may be from 1 to 2.

The separating step may include separating the precipitate from the second waste stream by at least one method selected from the group consisting of filtration, sedimentation, flocculation, centrifugal separation, and combinations thereof.

DETAILED DESCRIPTION

The present disclosure provides a process for the simultaneous removal of iron and phosphate ions from a chlorinated hydrocarbon waste stream, such as a waste stream derived from a process for manufacturing 1,1,1,3,3-pentachloropropane (HCC-240fa) and/or 1,1,1,3-tetrachloropropane (HCC-250fb). The waste stream contains at least one of chlorinated hydrocarbons, tributyl phosphate (TBP) and/or triethyl phosphate (TEP), iron, $FeCl_2$ and/or $FeCl_3$, a $TBP$-$FeCl_2$ complex and/or a $TBP$-$FeCl_3$ complex, and a $TEP$-$FeCl_2$ complex and/or a $TEP$-$FeCl_3$ complex, and is subjected to thermal oxidation to generate a second, aqueous waste stream containing at least one of hydrogen chloride (HCl), $FeCl_3$ and/or $FeCl_2$, $H_3PO_4$, and water. The second waste stream is exposed to a base to generate a precipitate including at least one insoluble compound selected from the group consisting of $FePO_4$, $Fe(OH)_3$, and $Ca_3(PO_4)_2$, and the precipitate is separated from the second waste stream to produce a liquid phase including only trace amounts of iron and phosphate ions.

A waste stream, sometimes referred to herein a first waste stream, is derived from a process for manufacturing 1,1,1,3,3-pentachloropropane (HCC-240fa) and/or 1,1,1,3-tetrachloropropane (HCC-250fb) upon purging of the catalyst from the reaction of the foregoing process in order to remove high boiling organic impurities that are formed during the process and to maintain the catalyst activity.

This first waste stream contains at least one of chlorinated hydrocarbons, tributyl phosphate (TBP) and/or triethyl phosphate (TEP), iron, $FeCl_2$ and/or $FeCl_3$, a $TBP$-$FeCl_2$ complex and/or a $TBP$-$FeCl_3$ complex, and a $TEP$-$FeCl_2$ complex and/or a $TEP$-$FeCl_3$ complex.

After the first waste stream is discharged from the HCC-240fa and/or HCC-250fb process, same is directed to a waste treatment unit where the constituent components of the first waste stream, including the chlorinated hydrocarbons, TBP, TEP, iron, $FeCl_2$, $FeCl_3$, $TBP$-$FeCl_2$ complex, $TBP$-$FeCl_3$ complex, $TEP$-$FeCl_2$ complex, and $TEP$-$FeCl_3$ complex, are destroyed by thermal oxidization, such as by incineration, for example.

The flue gas from the incineration may be cooled to a temperature generally between 40° C. and 70° C. by the addition of water, for example, such that the majority of the hydrogen chloride (HCl) remains in the flue gas and may optionally itself be recovered by other means, while amounts of the HCl, iron oxide ($Fe_2O_3$ and/or FeO) and phosphorus pentoxide ($P_2O_5/P_4O_{10}$) are captured in the water to form an aqueous stream including the foregoing components. In the aqueous stream, the $Fe_2O_3$ and/or FeO reacts with HCl in the water to form $FeCl_3$ and/or $FeCl_2$, and the $P_2O_5$ and/or the $P_4O_{10}$ react with water to form $H_3PO_4$.

The aqueous stream generated after water addition, sometimes referred to herein as a second waste stream, includes relatively high concentrations of ferrous chloride ($FeCl_2$) and/or ferric chloride ($FeCl_3$), as well as hydrogen phosphate ($H_3PO_4$) and, due to environmental regulations, typically cannot be readily disposed of. The second waste stream may also include hydrogen chloride (HCl).

In the second waste stream, the total concentration of ferrous chloride ($FeCl_2$) and ferric chloride ($FeCl_3$) may be as little as 0 wt. %, 3 wt. %, 5 wt. %, or 7 wt. %, or as great as 13 wt. %, 15 wt. %, 17 wt. %, 20 wt. %, or may be within any range defined between any two of the foregoing values, such as 0 wt. % to 20 wt. %, 3 wt. % to 17 wt. %, 5 wt. % to 15 wt. %, or 7 wt. % to 13 wt. %, for example.

Also, in the second waste stream, the total concentration of hydrogen phosphate ($H_3PO_4$) may be as little as 0 wt. %, 3 wt. %, 5 wt. %, or 7 wt. %, or as great as 13 wt. %, 15 wt. %, 17 wt. %, 20 wt. %, or may be within any range defined between any two of the foregoing values, such as 0 wt. % to 20 wt. %, 3 wt. % to 17 wt. %, 5 wt. % to 15 wt. %, or 7 wt. % to 13 wt. %, for example.

In the second waste stream, the concentration of HCl may be as little as 0 wt. %, 1 wt. %, 5 wt. %, or as high as 10 wt. %, 25 wt. % or 40 wt. %, or may be within any range defined between any two of the foregoing values, such as 0 wt. % to 40 wt. %, 1 wt. % to 25 wt. %, or 5 wt. % to 10 wt. %, for example.

The molar ratio of iron ions to phosphate ions in the second waste stream may be from 1 to 10, from 1 to 8, from 3 to 7, or from 1 to 2, for example.

The second waste stream is then treated by, or subjected to, a base or basic solution. The base may be an inorganic base including at least one base such as potassium hydroxide (KOH), sodium hydroxide (NaOH), calcium hydroxide ($Ca(OH)_2$) or Calcium oxide (CaO). The pH of the basic solution may be any pH above 7, and the pH of the second waste stream after same is treated with the basic solution may be as little as 1, 2, or 3, or as great as 8, 9, or 10, or may be within any range defined between any two of the foregoing values, such as 1 to 10, 2 to 9, or 3 to 8, for example. In one particular embodiment, the pH of the second waste stream after same is treated with the basic solution is between 2.5 and 8.

Exemplary reactions illustrating the treatment of the second waste stream with base are set forth below.

When CaO is used as the base, the following reactions (3) to (7) are illustrative:

$$CaO + H_2O \rightarrow Ca(OH)_2 \qquad (3)$$

$$2HCl + Ca(OH)_2 \rightarrow CaCl_2 + 2H_2O \qquad (4)$$

$$FeCl_3 + H_3PO_4 \rightarrow FePO_4(s) + 3HCl \qquad (5)$$

$$2FeCl_3 + 3Ca(OH)_2 \rightarrow 2Fe(OH)_3(s) + 3CaCl_2 \qquad (6)$$

$$2H_3PO_4 + 3Ca(OH)_2 \rightarrow Ca_3(PO_4)_2(s) + 6H_2O \qquad (7)$$

When CaO is added to the second waste stream, CaO is converted to $Ca(OH)_2$ by reacting with water per reaction (3), Ca(OH)$_2$ reacts with HCl in the second waste stream to form soluble CaCl$_2$ per reaction (4), and the pH of the second waste stream is increased. The HCl is generated via thermal oxidation of chlorinated carbons. The majority of the H$_3$PO$_4$ present in the second waste stream reacts with FeCl$_3$ per reaction (5) to generate water insoluble solid FePO$_4$ when the pH is adjusted to 2.5 or higher after inorganic base is added. Excess FeCl$_3$ reacts with Ca(OH)$_2$ per reaction (6) to form insoluble Fe(OH)$_3$. A minor amount of H$_3$PO$_4$ may react with Ca(OH)$_2$ to generate Ca$_3$(PO$_4$)$_2$ per reaction (7), with the resulting Ca$_3$(PO$_4$)$_2$ have some solubility in water.

When KOH or NaOH are used as the base, the following reactions (8) to (11) are illustrative:

$$HCl + KOH/NaOH \rightarrow KCl/NaCl + H_2O \quad (8)$$

$$FeCl_3 + H_3PO_4 \rightarrow FePO_4(s) + 3HCl \quad (9)$$

$$FeCl_3 + 3KOH/NaOH \rightarrow Fe(OH)_3(s) + 3KCl/NaCl \quad (10)$$

$$H_3PO_4 + 3K(OH)/NaOH \rightarrow K_3PO_4/Na_3PO_4 + 3H_2O \quad (11)$$

When KOH or NaOH is added to the second waste stream, KOH or NaOH reacts with HCl in the second waste stream to form soluble KCl or NaCl per reaction (8) and the pH of the waste stream is increased. The majority of the H$_3$PO$_4$ present in the second waste stream reacts with FeCl$_3$ per reaction (9) to generate water insoluble solid FePO$_4$ when the pH is adjusted to 2.5 or higher after inorganic base is added. Excess FeCl$_3$ reacts with KOH or NaOH per reaction (10) to form insoluble Fe(OH)$_3$. A minor amount of H$_3$PO$_4$ may react with KOH or NaOH to generate K$_3$PO$_4$/Na$_3$PO$_4$ per reaction (11), with the resulting K$_3$PO$_4$/Na$_3$PO$_4$ soluble in water.

In the present process, residual phosphate ion concentration in the liquid phase of the second waste stream after KOH/NaOH is added and the generated solids are separated is higher than when CaO or Ca(OH)$_2$ is used because the solubility of K$_3$PO$_4$/Na$_3$PO$_4$ is much higher than Ca$_3$(PO$_4$)$_2$.

The second waste stream may be treated with the base by discharging the second waste stream into a mixer, to which the base is added to adjust the pH of the second waste stream to the levels set forth above. As a result of such process, a solid precipitate is formed in the liquid phase second waste stream, which precipitate includes one or more of iron phosphate (FePO$_4$), iron hydroxide (Fe(OH)$_3$), and calcium phosphate (Ca$_3$(PO$_4$)$_2$) which are insoluble in water under weak acid or basic pH conditions and therefore precipitate out of the second waste stream as solids.

Optionally, in order to adjust the molar ratio of iron and phosphorus ions in the second waste stream, fresh ferrous chloride (FeCl$_2$) and/or ferric chloride (FeCl$_3$) may be added as desired during the foregoing base treatment step.

Thereafter, the solid precipitate of iron phosphate (FePO$_4$), iron hydroxide (Fe(OH)$_3$), and/or calcium phosphate (Ca$_3$(PO$_4$)$_2$) is separated from the liquid of the second waste stream by filtration, physical and/or chemical sedimentation, flocculation, centrifugal separation, or a combination of the foregoing techniques.

After the foregoing separation, the liquid phase of the second waste stream will include a relatively large amount of calcium chloride (CaCl$_2$) and, advantageously, only trace amounts of ferric and/or ferrous iron ions (Fe$^{3+}$ and/or Fe$^{2+}$) and phosphate ions (PO$_4^{3-}$).

The total amount of iron ions remaining in the liquid phase of the second waste stream, also referred to herein as residual iron, may be as little as, or less than, 0.01 ppm, 0.1 ppm, 1 ppm, or as great as, or less than 10 ppm, 50 ppm, or 500 ppm, or within any range defined between any two of the foregoing values, such as 0.01 to 500 ppm, 0.1 to 50 ppm, or 1 to 10 ppm, for example.

The amount of phosphate ions remaining in the liquid phase of the second waste stream, also referred to herein as phosphorus or residual phosphorus, may be as little as, or less than, 0.01 ppm, 0.1 ppm, 1 ppm, or as great as, or less than 10 ppm, 50 ppm, or 500 ppm, or within any range defined between any two of the foregoing values, such as 0.01 to 500 ppm, 0.1 to 50 ppm, or 1 to 10 ppm, for example.

Optionally, water may be removed from the liquid phase of the treated second waste stream by vaporization, for example, in order to concentrate and recover CaCl$_2$ as a by-product.

EXAMPLES

Example 1

300 grams of water solution containing 4.0 wt. % FeCl$_3$ and 2.0 wt. % H$_3$PO$_4$ (Fe/P molar ratio=1.21) was added into a 500 ml glass beaker. With agitation, 30% NaOH solution was slowly added into the beaker to adjust the solution pH to 3.0. Then, the mixture was filtered, and Fe and P ion concentrations in the filtrate measured by inductively coupled plasma mass spectrometry (ICP-MS) were 12.5 ppm and 18.6 ppm, respectively.

Example 2

300 grams of water solution containing 4.0 wt. % FeCl$_3$ and 2.0 wt. % H$_3$PO$_4$ (Fe/P molar ratio=1.21) was added into a 500 ml glass beaker. With agitation, 30% NaOH solution was slowly added into the beaker to adjust the solution pH to 4.0. Then, the mixture was filtered, and Fe and P ion concentrations in the filtrate measured by inductively coupled plasma mass spectrometry (ICP-MS) were 1.1 ppm and 19.9 ppm, respectively.

Example 3

300 grams of water solution containing 4.0 wt. % FeCl$_3$ and 2.0 wt. % H$_3$PO$_4$ (Fe/P molar ratio=1.21) was added into a 500 ml glass beaker. With agitation, 30% NaOH solution was slowly added into the beaker to adjust the solution pH to 5.0. Then, the mixture was filtered, and Fe and P ion concentrations in the filtrate measured by inductively coupled plasma mass spectrometry (ICP-MS) were 0.08 ppm and 29.0 ppm, respectively.

Example 4

300 grams of water solution containing 4.0 wt. % FeCl$_3$ and 2.0 wt. % H$_3$PO$_4$ (Fe/P molar ratio=1.21) was added into a 500 ml glass beaker. With agitation, 30% NaOH solution was slowly added into the beaker to adjust the solution pH to 7.0. Then, the mixture was filtered, and Fe and P ion concentrations in the filtrate measured by inductively coupled plasma mass spectrometry (ICP-MS) were 0.15 and 57.4 ppm, respectively.

Example 5

300 grams of water solution containing 4.0 wt. % FeCl$_3$ and 2.0 wt. % H$_3$PO$_4$ (Fe/P molar ratio=1.21) was added into a 500 ml glass beaker. With agitation, 30% NaOH solution was slowly added into the beaker to adjust the solution pH to 8.0. Then, the mixture was filtered, and Fe and P ion concentrations in the filtrate measured by inductively coupled plasma mass spectrometry (ICP-MS) were 0.23 ppm and 354.8 ppm, respectively.

Example 6

300 grams of water solution containing 4.0 wt. % $FeCl_3$ and 2.0 wt. % $H_3PO_4$ (Fe/P molar ratio=1.21) was added into a 500 ml glass beaker. With agitation, CaO powder was slowly added into the beaker to adjust the solution pH to 3.2. Then, the mixture was filtered, and Fe and P ion concentrations in the filtrate measured by inductively coupled plasma mass spectrometry (ICP-MS) were 0.05 ppm and 0.74 ppm, respectively.

Example 7

300 grams of water solution containing 4.0 wt. % $FeCl_3$ and 2.0 wt. % $H_3PO_4$ (Fe/P molar ratio=1.21) was added into a 500 ml glass beaker. With agitation, CaO powder was slowly added into the beaker to adjust the solution pH to 5.3. Then, the mixture was filtered, and Fe and P ion concentrations in the filtrate measured by inductively coupled plasma mass spectrometry (ICP-MS) were 0.02 ppm and 0.27 ppm, respectively.

Example 8

300 grams of water solution containing 4.0 wt. % $FeCl_3$ and 2.0 wt. % $H_3PO_4$ (Fe/P molar ratio=1.21) was added into a 500 ml glass beaker. With agitation, CaO powder was slowly added into the beaker to adjust the solution pH to 5.9. Then, the mixture was filtered, and Fe and P ion concentrations in the filtrate measured by inductively coupled plasma mass spectrometry (ICP-MS) were 0.44 ppm and 1.1 ppm, respectively.

Example 9

300 grams of water solution containing 4.0 wt. % $FeCl_3$ and 2.0 wt. % $H_3PO_4$ (Fe/P molar ratio=1.21) was added into a 500 ml glass beaker. With agitation, CaO powder was slowly added into the beaker to adjust the solution pH to 7.7. Then, the mixture was filtered, and P ion concentration in the filtrate measured by inductively coupled plasma mass spectrometry (ICP-MS) was 0.47 ppm.

Example 10

300 grams of water solution containing 4.0 wt. % $FeCl_3$ and 2.0 wt. % $H_3PO_4$ (Fe/P molar ratio=1.21) was added into a 500 ml glass beaker. With agitation, CaO powder was slowly added into the beaker to adjust the solution pH to 9.3. Then, the mixture was filtered, and Fe and P ion concentrations in the filtrate measured by inductively coupled plasma mass spectrometry (ICP-MS) were 0.01 ppm and 0.37 ppm, respectively.

Example 11

300 grams of water solution containing 8.35 wt. % HCl, 1.55 wt. % $FeCl_3$ and 0.76 wt. % $H_3PO_4$ (Fe/P molar ratio=1.23) was added into a 500 ml glass beaker. With agitation, CaO powder was slowly added into the beaker to adjust the solution pH to 6.5. Then, the mixture was filtered, and P ion concentration in the filtrate measured by inductively coupled plasma mass spectrometry (ICP-MS) was 0.59 ppm.

Example 12

200 grams of water solution containing 6.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 5.8. Then, the mixture was filtered, and P ion concentration in the filtrate measured by inductively coupled plasma mass spectrometry (ICP-MS) was 0.49 ppm. By visual observation, the mixture turned into a gel-like non-flowable solid, and was difficult to be filtered.

Example 13

200 grams of water solution containing 7.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 6.1. Then, the mixture was filtered, and P ion concentration in the filtrate measured by inductively coupled plasma mass spectrometry (ICP-MS) was 0.41 ppm. By visual observation, the mixture turned into a gel-like non-flowable solid, and was difficult to be filtered.

Example 14

200 grams of water solution containing 8.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 5.7. Then, the mixture was filtered, and P ion concentration in the filtrate measured by inductively coupled plasma mass spectrometry (ICP-MS) was 0.61 ppm. By visual observation, the mixture was flowable and was able to be filtered.

Example 15

200 grams of water solution containing 10.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 5.8. Then, the mixture was filtered, and P ion concentration in the filtrate measured by inductively coupled plasma mass spectrometry (ICP-MS) was 0.65 ppm. By visual observation, the mixture was flowable and was able to be filtered.

Example 16

200 grams of water solution containing 15.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 4.4. Then, the mixture was filtered, and P ion concentration in the filtrate measured by inductively coupled plasma mass spectrometry (ICP-MS) was 0.86 ppm. By visual observation, the mixture was flowable and was able to be filtered.

Example 17

200 grams of water solution containing 15.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 6.2. Then, the mixture was filtered, and P ion concentration in the filtrate measured by inductively coupled plasma mass spectrometry (ICP-MS) was 1.9 ppm. By visual observation, the mixture was flowable and was able to be filtered.

Example 18

200 grams of water solution containing 15.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 8.0. Then, the mixture was filtered, and P ion concentration in the filtrate measured by inductively coupled plasma mass spectrometry (ICP-MS) was 1.3 ppm. By visual observation, the mixture was flowable and was able to be filtered.

Example 19

200 grams of water solution containing 20.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 7.3. Then, the mixture was filtered, and P ion concentration in the filtrate measured by inductively coupled plasma mass spectrometry (ICP-MS) was 2.0 ppm. By visual observation, the mixture was flowable and was able to be filtered.

Example 20

200 grams of water solution containing 15.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 4.3. Then, the mixture was filtered, and Fe and P ion concentrations in the filtrate measured by inductively coupled plasma mass spectrometry (ICP-MS) were 0.21 and 0.12 ppm, respectively.

Example 21

200 grams of water solution containing 15.0 wt. % HCl, 9.87 wt. % $FeCl_3$ and 3.76 wt. % $H_3PO_4$ (Fe/P molar ratio=1.59) was added into a 500 ml glass beaker. With agitation, CaO powder was slowly added into the beaker to adjust the solution pH to 9.6. Then, the mixture was filtered, and Fe and P ion concentrations in the filtrate measured by inductively coupled plasma mass spectrometry (ICP-MS) were 141 and 4.0 ppm, respectively.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

What is claimed is:

1. A process for the removal of iron and phosphate ions from a waste stream, comprising the steps of:
    providing an aqueous waste stream containing $H_3PO_4$, and at least one of hydrogen chloride (HCl), $FeCl_3$, $FeCl_2$, and water;
    exposing the waste stream to a base to generate a precipitate including at least one insoluble compound selected from the group consisting of $FePO_4$, and $Ca_3(PO_4)_2$ and optionally $Fe(OH)_3$, and
    separating the precipitate from the waste stream.

2. The process of claim 1, wherein following said separation step, the waste stream is a liquid phase including $CaCl_2$) and at least one of the following:
    less than 500 ppm of iron ions; and
    less than 500 ppm phosphate ions.

3. The process of claim 2, wherein following said separation step, the waste stream is a liquid phase including $CaCl_2$) and at least one of the following:
    less than 10 ppm of iron ions; and
    less than 10 ppm phosphate ions.

4. A process for the removal of iron and phosphate ions from a waste stream, comprising the steps of:
    providing an aqueous waste stream containing $H_3PO_4$, and at least one of hydrogen chloride (HCl), $FeCl_3$, $FeCl_2$, $H_3PO_4$, and water;
    exposing the waste stream to a base to generate a precipitate including at least one insoluble compound selected from the group consisting of $FePO_4$, $Fe(OH)_3$, $Ca_3(PO_4)_2$;
    separating the precipitate from the waste stream;
    vaporizing liquid from the waste stream; and
    recovering solid $CaCl_2$.

5. The process of claim 1, wherein the base is selected from the group consisting of potassium hydroxide (KOH), sodium hydroxide (NaOH), calcium oxide (CaO), calcium hydroxide ($Ca(OH)_2$), and combinations thereof.

6. The process of claim 1, wherein following said exposing step, the pH of the waste stream is from 1 to 8.

7. The process of claim 1, wherein following said separation step, a molar ratio of iron ions to phosphate ions in the waste stream is from 1 to 10.

8. The process of claim 1, wherein following said separation step, a molar ratio of iron ions to phosphate ions in the waste stream is from 1 to 2.

9. The process of claim 1, wherein said separating step comprises separating the precipitate from the waste stream by at least one method selected from the group consisting of filtration, sedimentation, flocculation, centrifugal separation, and combinations thereof.

10. A process for the removal of iron and phosphate ions from a waste stream, comprising the steps of:
    providing an organic-containing first waste stream containing at least one of chlorinated hydrocarbons, tributyl phosphate (TBP) and/or triethyl phosphate (TEP), iron, $FeCl_2$ and/or $FeCl_3$, a TBP-$FeCl_2$ complex and/or a TBP-$FeCl_3$ complex, and a TEP-$FeCl_2$ complex and/or a TEP-$FeCl_3$ complex;
    subjecting the first waste stream to thermal oxidation and addition of water to generate an aqueous second waste stream containing at least one of hydrogen chloride (HCl), $FeCl_3$, $FeCl_2$, $H_3PO_4$, and water;

exposing the second waste stream to a base to generate a precipitate including at least one insoluble compound selected from the group consisting of $FePO_4$, $Fe(OH)_3$, and $Ca_3(PO_4)_2$; and separating the precipitate from the second waste stream.

11. The process of claim 10, wherein following said separation step, the second waste stream is a liquid phase including $CaCl_2$) and at least one of the following:

less than 500 ppm of iron ions; and less than 500 ppm phosphate ions.

12. The process of claim 11, wherein following said separation step, the second waste stream is a liquid phase including $CaCl_2$) and at least one of the following:

less than 10 ppm of iron ions; and less than 10 ppm phosphate ions.

13. The process of claim 10, further including the additional steps, following said separating step, of:

vaporizing liquid from the second waste stream; and recovering solid $CaCl_2$).

14. The process of claim 10, wherein the base is selected from the group consisting of potassium hydroxide (KOH), sodium hydroxide (NaOH), calcium oxide (CaO), calcium hydroxide ($Ca(OH)_2$), and combinations thereof.

15. The process of claim 10, wherein following said subjecting step, the second waste stream includes a total concentration of $FeCl_3$ and $FeCl_2$ of less than 20 wt. %.

16. The process of claim 10, wherein following said subjecting step, the second waste stream includes a total concentration of $H_3PO_4$ of less than 20 wt. %.

17. The process of claim 10, wherein following said subjecting step, the second waste stream includes less than 40 wt. % of HCl.

18. The process of claim 10, wherein following said separation step, a molar ratio of iron ions to phosphate ions in the second waste stream is from 1 to 10.

19. The process of claim 10, wherein following said separation step, a molar ratio of iron ions to phosphate ions in the second waste stream is from 1 to 2.

20. The process of claim 10, wherein said separating step comprises separating the precipitate from the second waste stream by at least one method selected from the group consisting of filtration, sedimentation, flocculation, centrifugal separation, and combinations thereof.

* * * * *